United States Patent
Frischen et al.

(10) Patent No.: US 11,489,470 B2
(45) Date of Patent: Nov. 1, 2022

(54) SENSOR DEVICE FOR AN ELECTRIC MACHINE, METHOD FOR THE OPERATION OF A SENSOR DEVICE

(71) Applicant: Robert Bosch GmbH, Stuttgart (DE)

(72) Inventors: Andreas Frischen, Leonberg (DE); Fabian Utermoehlen, Lippstadt (DE)

(73) Assignee: Robert Bosch GmbH, Stuttgart (DE)

( * ) Notice: Subject to any disclaimer, the term of this patent is extended or adjusted under 35 U.S.C. 154(b) by 755 days.

(21) Appl. No.: 16/443,041

(22) Filed: Jun. 17, 2019

(65) Prior Publication Data
US 2020/0007061 A1 Jan. 2, 2020

(30) Foreign Application Priority Data
Jun. 30, 2018 (DE) .................. 10 2018 210 816.1

(51) Int. Cl.
| | |
|---|---|
| *H02K 7/116* | (2006.01) |
| *H02K 11/24* | (2016.01) |
| *H02P 21/20* | (2016.01) |
| *G01L 3/10* | (2006.01) |

(52) U.S. Cl.
CPC .............. *H02P 21/20* (2016.02); *G01L 3/101* (2013.01); *H02K 7/116* (2013.01); *H02K 11/24* (2016.01)

(58) Field of Classification Search
CPC ................................ H02K 7/116; H02K 11/24
USPC ........................................................ 310/68 B
See application file for complete search history.

(56) References Cited

U.S. PATENT DOCUMENTS

| | | | | |
|---|---|---|---|---|
| 2014/0346990 | A1* | 11/2014 | Dib | G01B 7/30 |
| | | | | 318/400.32 |
| 2016/0036307 | A1 | 2/2016 | Morris | |
| 2017/0324304 | A1* | 11/2017 | Ito | H02K 21/22 |

FOREIGN PATENT DOCUMENTS

| | | | |
|---|---|---|---|
| CN | 101076733 A | | 11/2007 |
| CN | 205836531 U | * | 12/2016 |
| JP | 2001-124153 A | | 5/2001 |

* cited by examiner

*Primary Examiner* — Jose A Gonzalez Quinones
(74) *Attorney, Agent, or Firm* — Maginot, Moore & Beck LLP

(57) ABSTRACT

A sensor device for an electric machine includes a rotor shaft mounted rotatably in a housing, with a signal generator that is or can be joined non-rotatably to the rotor shaft and is or can be arranged axially on the end face of the rotor shaft. A signal sensor is fixed to the housing opposite on the end face of the signal generator and at a distance from the signal generator. The signal sensor acquires an axial distance from the signal generator.

8 Claims, 5 Drawing Sheets

SENSOR DEVICE FOR AN ELECTRIC MACHINE, METHOD FOR THE OPERATION OF A SENSOR DEVICE

This application claims priority under 35 U.S.C. § 119 to patent application number DE 10 2018 210 816.1 filed on Jun. 30, 2018 in Germany, the disclosure of which is incorporated herein by reference in its entirety The disclosure relates to a sensor device for an electric machine, in particular a motor vehicle, that comprises a rotatably mounted rotor shaft, with a signal generator that is joined non-rotatably to the rotor shaft and is arranged axially on the end face of the rotor shaft, and with a signal sensor fixed to the housing which lies opposite the end face of the signal generator and is arranged at a distance from the signal generator.

The disclosure further relates to a method for the operation of such a sensor device.

BACKGROUND

Sensor devices of the type referred to above are known from the prior art. Electric vehicles and hybrid vehicles with an electric drive device frequently use an asynchronous machine or a synchronous machine as an electric motor which can also be operated in generator mode, wherein both comprise a stator with a fixed location, or fixed with respect to the housing, and a rotor mounted rotatably relative to the stator. As a rule, the stator carries three or more mutually offset winding phases of a drive winding, wherein the drive phases are offset by 120°/p with respect to one another, where p represents the number of pole pairs.

The asynchronous machine (ASM) comprises, for example, a rotor that is made of electrically conductive bars that are short-circuited at the ends in the form a ring. When the magnetic rotor field turns, a voltage is induced in this, said voltage giving rise to a flow of current which in turn develops an opposing magnetic field, whereby a rotary movement of the rotor results. Since the induced voltage becomes zero when the rotor field and the stator are rotating at the same speed, a differential speed of rotation, referred to as the slip, results, and has a direct effect on the torque generated by the electric motor.

In the synchronous machine, the rotor usually consists of an armature that carries an excitation coil in which a direct current flows that generates a static magnetic field. As an alternative to this, a permanent magnet can also be used in the rotor to generate the static magnetic field. This is then a so-called permanently excited synchronous machine (PSM) which, due to the zero-power excitation, exhibits a higher efficiency and is thus very well-suited to traction applications in motor vehicles. The speed of rotation of the rotor is, in this case, identical as a matter of principle to the rotation speed of the excitation field, while the torque generated depends on the phase offset, i.e. the angular difference between the stator field and the rotor field.

For the purposes of control, in the case of the asynchronous machine the speed of rotation of the rotor must be known, and in the case of the permanently excited synchronous machine the absolute angular position of the rotor must be known. Depending on the speed of rotation or angular position, an inverter of power electronics of the respective electric machine can be driven to achieve the desired torque.

The use of a so-called resolver is known for the determination of these variables; this, however, requires a relatively large amount of installation space, and requires complex signal provision and preparation as well as a complex structure of the resolver with wound coils. The provision of a rotation speed encoder is also known, implemented for example on the basis of one or a plurality of Hall elements which evaluate the magnetic field of the signal generator. Known operating principles of these sensors include magnetoresistive (AMR, GMR, TMR), or are based on the Hall effect. The provision of inductive angle sensors on the basis of decoupled coils or sensor apparatuses that are based on the eddy current effect are furthermore known.

It is disadvantageous for the known sensor apparatuses that inaccuracies and measurement errors can arise that in particular result from an inhomogeneity of the generated magnetic fields and of the resulting magnetic fluxes through the coils. Angle errors can arise from this which repeat cyclically with every rotation, depending on the angle of rotation, and which therefore occur in the frequency domain as harmonics, that is multiples, and in particular integral multiples, of the rotation frequency. The second harmonic in the sensor signal most particularly, can constitute a significant portion of the total, cyclically repeating, angle error.

Since the inhomogeneity of the magnetic flux changes depending on the relative position, in particular on the axial distance between the signal sensor and the signal generator, the strength of the harmonic interference is also a function of the relative position, in particular of the axial distance between the signal sensor and the signal generator. This distance depends, in particular, on mechanical tolerances and on temperature influences.

In the case of sensor devices that have three coils, an angle error that corresponds to a third harmonic results from the second harmonic in the sensor signal. This can be described as follows. Three sensor signals $s_1$, $s_2$ and $s_3$ are given according to:

$$s1 = \cos(\varphi) + a \cdot \cos(n \cdot \varphi)$$

$$s_2 = \cos(\varphi - \tfrac{2}{3}\pi) + a \cdot \cos(n \cdot (\varphi - \tfrac{2}{3}\pi))$$

$$s_3 = \cos(\varphi - \tfrac{2}{3}\pi) + a \cdot \cos(n \cdot (\varphi - \tfrac{2}{3}\pi))$$

Here $\varphi$ represents the time-dependent angle, n the harmonic as a multiple of the rotation frequency, and a the amplitude of the harmonic relative to the amplitude of the wanted signal. It can be seen that a three-phase system in which the signals are respectively electrically shifted through 120° is involved.

The result, for example, is that the second harmonic in the sensor signal causes an unwanted third harmonic in the angle signal, whose amplitude is proportional to the amplitude of the second harmonic in the sensor signal. This cyclic error impairs the accuracy of the sensor apparatus, and can, for example, lead to a cyclically changing torque when used with an electric machine.

Known correction methods use fixed correction parameters to improve the estimated angle through compensation of the angle error. These methods are, however, disadvantageous in that they do not take into account the relative changes in position, in particular over the lifetime of the sensor apparatus. The change in the amplitude of the disturbance variable caused thereby can lead to a harmonic error in the estimated angle.

SUMMARY

The sensor device according to the disclosure has the advantage that an improved angle estimation of the rotor shaft is ensured with low amplitudes in the angle error, and that, in addition, a change in the axial distance between the signal sensor and the signal generator is taken into account. Furthermore the solution according to the disclosure offers the advantage that, with a known relationship between a further measured variable and the axial distance between the signal generator and the signal sensor, this further measured variable can be deduced. In particular, a force acting on the shaft through which a torque is transferred can be determined hereby. The sensor device is easy to implement and can thus be realized economically.

The sensor device according to the disclosure is characterized in that the signal sensor captures an axial distance to the signal generator. In addition to the usual capture of the orientation of a magnetic field of the signal generator, the distance lying between the signal generator and the signal sensor is henceforth captured by means of both said signal generator and said signal sensor. It is assumed here that this distance can change, for example due to a limited mechanical stiffness of the electric machine, or because a maximum possible displacement of the rotor shaft is explicitly provided. The change in the axial distance results in particular from a torque applied to the rotor shaft, so that, with knowledge of the respective distance, a conclusion can be drawn as to the torque.

According to an optional form of embodiment of the disclosure, the sensor device comprises a mechanical apparatus that is designed to displace the signal generator axially depending on a torque of the electric machine acting on the rotor shaft. Through this, the distance between the signal generator and the signal sensor is changed depending on the torque, whereby a further variable is available which can be used in the evaluation of the sensor signals in order to overcome the above-mentioned disadvantages.

The apparatus in particular comprises a support shaft aligned parallel to the rotor shaft and mounted rotatably, which can be part of a gearbox, wherein the rotor shaft and the support shaft are coupled to one another through a helical gearing, and wherein the rotor shaft is mounted such that it can be axially displaced. The support shaft is, for example, formed as a drive shaft for a gearbox or the like, so that the support shaft exercises an opposing force on the rotor shaft, whereby a defined axial displacement position of the rotor shaft, and thus of the signal generator to the signal sensor, is ensured.

It is furthermore preferably provided that an in particular actuatable brake apparatus, which for example exerts a specified braking torque or a specified braking force to the support shaft, is assigned to the support shaft so that a defined axial displacement of the rotor shaft or of the signal generator is ensured depending on the generated torque. It is furthermore preferably provided that the rotor shaft is formed in two segments, with a first shaft segment carrying a rotor, which is at least substantially mounted in a manner that cannot be axially displaced, and with a second shaft segment joined non-rotatably to the first shaft segment, which is mounted in a manner that can be axially displaced and which comprises the helical gearing as well as the signal generator. The advantages already mentioned emerge from this. The possibility that the rotor shaft with the rotor is itself displaced axially depending on the torque is avoided in this way. A stable operation of the electric machine is thereby ensured at all times.

The method according to the disclosure for the operation of such an electric machine, which is in particular carried out by a control device of the sensor apparatus specially set up for this purpose, ensures a precise angle estimation through an advantageous signal evaluation. The following steps for the operation of an electric machine are carried out for this purpose: In a step a) an output signal of the signal sensor, dependent on the angle of rotation, which signal in particular is of multiple parts, i.e. composed of a plurality of signal parts, wherein the signal parts for example respectively correspond to one signal phase, is first captured. In a subsequent step b) at least one signal phase and one signal amplitude are captured as signal parameters from the respective partial signal. Thereupon an intermediate variable is determined in a step c), in particular from the partial signals of the output signal, which is in particular determined in the manner of a vector length. After this, in a step d), the amplitude of a specifiable harmonic, in particular of the third harmonic, is determined, and in a subsequent step e) the current axial distance between the signal generator and the signal sensor is determined depending on the amplitude determined from step d) wherein, depending on the axial distance, the current torque is then determined in a step f). Recourse is preferably made, in particular in the last step, to previous measurements or calculations that determine the axial distance between the signal generator and the signal sensor depending on the torque. The effective torque of the electric machine is in particular determined, depending on the axial distance, by means of a characteristic curve that comprises distance and torque as values.

A Clarke transformation is preferably carried out before performing step c) if more than two partial signals are present. Three or more partial signals can be combined to form two partial power signals by means of the Clarke transformation. In the case of two coils, or of two-phase sensor devices, this step is advantageously omitted. The intermediate variable is preferably determined by means of the following formula:

$$r(k)=\sqrt{c_1(k)^2+c_2(k)^2},$$

where $r(k)$ is the output signal of the intermediate variable, $c_1(k)$ and $c_2(k)$ are the sine and cosine of the output signal of the Clarke transformation, and where the variable k identifies the index of the sampling time-point.

During the determination of the amplitude of the harmonics to be examined, in particular of the third harmonic in the angle domain which—in the case of 3-phase sensors—corresponds to the second harmonic in the signal domain, is performed using a plurality of values of the intermediate variable with the aid of the following formula:

$$\varepsilon(\varphi) = \varphi est - \varphi = \arctan2(c1, c2) - \varphi = \arctan\left(\frac{c_2}{c_1}\right) - \varphi$$

where a is the amplitude of the harmonic, k is the index of the sampling time-point and $r(k)$ is the intermediate variable, wherein the above formula relates only to the angle error. The amplitude is preferably estimated as follows:

$$a = \frac{1}{2n}\sum_{k=1}^{2n} (-1)^k r(k),$$

where a is the amplitude of the harmonic, k is the sampling time-point, n is the harmonic to be considered, and $r(k)$ is the input signal (e) at the sampling time-point k.

More than six sampling time-points are preferably taken into account in each rotation, while six sampling time-points at the respective minima and maxima are particularly expedient. The sampling time-points are, in particular, arranged distributed evenly around one rotation of the rotor shaft, that is at a mutual spacing of 60°, wherein the absolute position of the first point preferably does not lie at 0, but depends on a phase position of the harmonics of the error.

According to a preferred development of the disclosure, the amplitude of the sensor signals is determined from the signal parameters and compared with the amplitude of the specified harmonics, in order to verify the axial distance between the signal sensor and signal generator.

The relationship between signal excursion and the distance between the signal generator and signal sensor can be given in the form of a function that is monotonic within a defined range from, for example, 0.2 mm to 4 mm, which results from the weaker electromagnetic field at greater distances. With the aid of the verified distance, the effective torque is then determined in step d) depending on the now verified axial distance.

It is further preferably provided that, with the aid of an arctangent function, an angle is determined as the output signal of the Clarke transformation. A correction of an angle error that arises as a result of harmonics in the signal domain is advantageously corrected. This takes place preferably at at least one of three locations, namely immediately prior to the Clarke transformation, immediately after the Clarke transformation, or after the formation of the angle as output signal. Arbitrary combinations of multiple corrections are also possible here.

Preferably, in order to correct the angle, the value of the respective cosine function $$\varphi_{korr} = \varphi_{unkorr} - \alpha_{est} \cdot \cos(n \cdot \varphi_{unkorr} + \vartheta_{est})$$

is determined depending on the determined amplitudes and phases of the harmonics to be corrected for each signal phase and for each harmonic to be corrected, and is subtracted from the input signal, where $\alpha_{est}$ is the estimated amplitude of the harmonics, $\vartheta_{est}$ the estimated phase of the harmonics, $\varphi_{unkorr}$ the uncorrected angle, and $\varphi_{korr}$ is the corrected angle.

It is further preferably provided that the correction described is applied in the angle domain to the angle signal formed through the arctangent function. Here, in particular, the conversion of the amplitude and the harmonic number n in the signal domain is changed into the error amplitude and the harmonic number in the angle domain. This yields in particular the advantage that this method only has to be applied to a single signal, and is therefore at least computationally expensive.

BRIEF DESCRIPTION OF THE DRAWINGS

The disclosure is to be explained in more detail below with reference to the drawings, in which.

DETAILED DESCRIPTION

Figure 1:
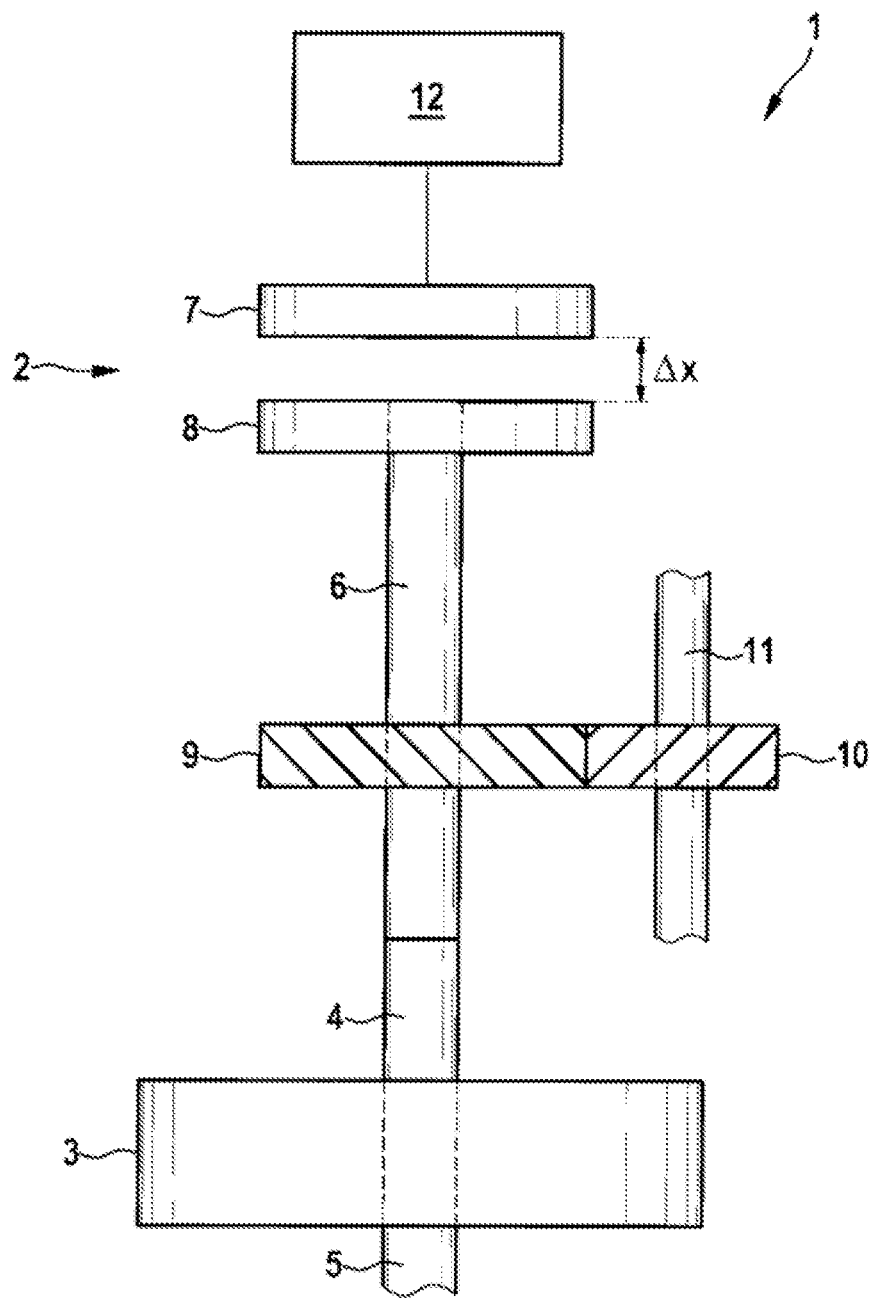
FIG. 1 shows a simplified illustration of an electric machine with an advantageous sensor device.

FIG. 1 shows a simplified illustration of an electric machine 1 with an advantageous sensor device 2. The electric machine 1 comprises a rotor 3 that is mounted rotatably on a rotor shaft 4 in a housing, not illustrated here. The rotor shaft 4 is formed in two segments, with a first shaft segment 5 that carries the rotor 3 and with a second shaft segment 6 which will be considered in more detail later. The rotor shaft 4 is formed as one piece according to a further exemplary embodiment. The sensor device 2 comprises a signal sensor 7 that is designed to interact with a signal generator 8. The signal generator 8 is arranged at the free end face of the rotor shaft 4, and the signal sensor 7 is arranged opposite the signal generator 8 at the end face, so that a distance $\Delta x$ exists between signal generator 8 and signal sensor 7. A toothed wheel 9 is arranged on the shaft segment 6, being engaged with a toothed wheel 10 that is arranged non-rotatably on a support shaft 11 parallel to the rotor shaft 4. The toothed wheels 9, 10 are designed as helical gears, so that, depending on a torque generated by the electric machine 1, a force is output, acting axially on the rotor shaft 4, as a result of the helical gearing. The shaft segment 6 is mounted such that it can be displaced axially within a limited range, and is coupled non-rotatably to the shaft segment 4. As a result, the distance $\Delta x$ between the signal generator 8 and the signal sensor 7 changes depending on the torque that is acting. The sensor device 2 furthermore comprises a control device 12 that is specially set up to carry out the method described in more detail below. The arrangement of the toothed wheels 10, 9 and the electric machine 1 can also be exchanged.

The sensor device 2 can be designed as a resolver, as a Hall-element-based or magnetoresistive (AMR, GMR or TMR) rotation speed encoder and/or as a phase encoder, as an inductive angle sensor or also as an eddy current effect sensor. All the sensor variants give rise to the disadvantage that measurement errors and inaccuracies can arise, resulting in particular from the inhomogeneity of the magnetic fields generated around them and the resulting magnetic fluxes through the coils. Angle errors result from this which, depending on the angle, repeat cyclically with each rotation and are therefore found in the frequency domain as harmonics, that is as multiples, and in particular integral multiples, of the rotation frequency. The second harmonic in the sensor signal in particular can make up a significant portion of the total, cyclically repeating, angle error.

Because the inhomogeneity of the magnetic flux changes depending on the relative position, in particular the axial distance, between the signal generator 8 and the signal sensor 7, the strength of the harmonic interference is also a function of the relative position, in particular of the axial distance $\Delta x$. This distance $\Delta x$ depends on mechanical tolerances and temperature influences as well as on the torque delivered by the electric machine 1, as explained above. In the case of sensors with three coils, an angle error that corresponds to a third harmonic results from the second harmonic in the sensor signal. This can be shown in the following calculation with three sensor signals $s_1$, $s_2$ and $s_3$:

$$s_1 = \cos(\varphi) + a \cdot \cos(n \cdot \varphi)$$

$$s_2 = \cos(\varphi - \tfrac{2}{3}\pi) + a \cdot \cos(n \cdot (\varphi - \tfrac{2}{3}\pi))$$

$$s_3 = \cos(\varphi - \tfrac{2}{3}\pi) + a \cdot \cos(n \cdot (\varphi - \tfrac{2}{3}\pi))$$

It can be seen that this relates to a three-phase system with an electrical phase shift of 120° between each of the signals. By means of the Clarke transformation, a two-phase signal $c_1$, $c_2$ is determined from the three-phase signal:

$$c_1 = \frac{2}{3}S_1 - \frac{1}{3}S_2 - \frac{1}{3}S_3$$

$$c_1 = \cos(\varphi) + \frac{1}{3}a\left(2\cos(n\varphi) - \cos\left(n\left(\frac{2}{3}\pi + \varphi\right)\right) - \cos\left(n\left(-\frac{2}{3}\pi + \varphi\right)\right)\right)$$

$$c_2 = -\frac{1}{\sqrt{3}}S2 + \frac{1}{\sqrt{3}}S3$$

$$c_2 = \sin(\varphi)\frac{2a\sin\left(\frac{2\pi n}{3}\right)\sin(n\varphi)}{\sqrt{3}}$$

After this, an arctangent function can be used to estimate the angle $\varphi_{est}$ to be measured.

$$\varphi_{est} = \arctan 2(c_1, c_2)$$

The error $\varepsilon(\varphi)$ of this estimated angle is then given by $$\varepsilon(\varphi) = \varphi_{est} - \varphi = \arctan 2(c_1, c_2) - \varphi = \arctan\left(\frac{c_2}{c_1}\right) - \varphi$$

By inserting different harmonics n, different harmonics result in the angle error which, to a first approximation, can be assumed to have the values in the following table, which were determined through a first-order Taylor expansion.

| Harmonic in the signal domain (n) | Approximated error in the angle domain [degrees] |
|---|---|
| 0 | 0 |
| 1 | 0 |
| 2 | $-a \cdot \frac{180}{\pi} \cdot \sin(3\varphi)$ |
| 3 | 0 |
| 4 | $a \cdot \frac{180}{\pi} \cdot \sin(3\varphi)$ |
| 5 | $-a \cdot \frac{180}{\pi} \cdot \sin(6\varphi)$ |
| 6 | 0 |
| 7 | $a \cdot \frac{180}{\pi} \cdot \sin(6\varphi)$ |
| 8 | $-a \cdot \frac{180}{\pi} \cdot \sin(9\varphi)$ |
| 9 | 0 |
| 10 | $a \cdot \frac{180}{\pi} \cdot \sin(9\varphi)$ |
| 11 | $-a \cdot \frac{180}{\pi} \cdot \sin(12\varphi)$ |
| 12 | 0 |
| 13 | $a \cdot \frac{180}{\pi} \cdot \sin(12\varphi)$ |
| 14 | $-a \cdot \frac{180}{\pi} \cdot \sin(15\varphi)$ |
| 15 | 0 |

It can be seen that, for example, the second harmonic in the sensor signal causes an unwanted third harmonic in the angle signal, whose amplitude is proportional to the amplitude of the second harmonics in the sensor signal. This cyclic error impairs the accuracy of the sensor device and can, for example, lead to a cyclically changing torque in the application with the electric machine 1.

By means of the present sensor device 2 and the method described below for operation of same, an improved angle estimate with smaller amplitude angle errors is made available. In addition, the relative position, or its change, in particular of the axial distance Δx is estimated, so that with a known relationship between the axial distance and a further measured value, a conclusion can be drawn as to the further measured value, in particular of the torque of the electric machine. The advantage of a higher angular precision and a more robust angle signal of the sensor device 2 emerges from this. The method described below is simple to implement, since it can be implemented easily on the control device 12. The torque delivered is easy to determine through the method, and can therefore be captured without a separate sensor. Hardly any additional costs, if any, arise.

The present method is based on the one hand on the observation of the amplitude of the harmonics, in particular of the second harmonics in the sensor signal during operation, and on the other hand on the observation of the signal amplitude/of the signal excursion when operating. Correction parameters for the angle error can be derived from these two values, and the distance between the signal generator 8 and the signal sensor 7 can be estimated. The estimation of the torque is then carried out depending on the estimated distance Δx. The process for the estimation of the second harmonics in the sensor signal when operating, the estimation of the distance between the signal generator 8 and signal sensor 7, as well as the estimation of the torque, which is carried out by the control device 12, is presented below.

Figure 2:
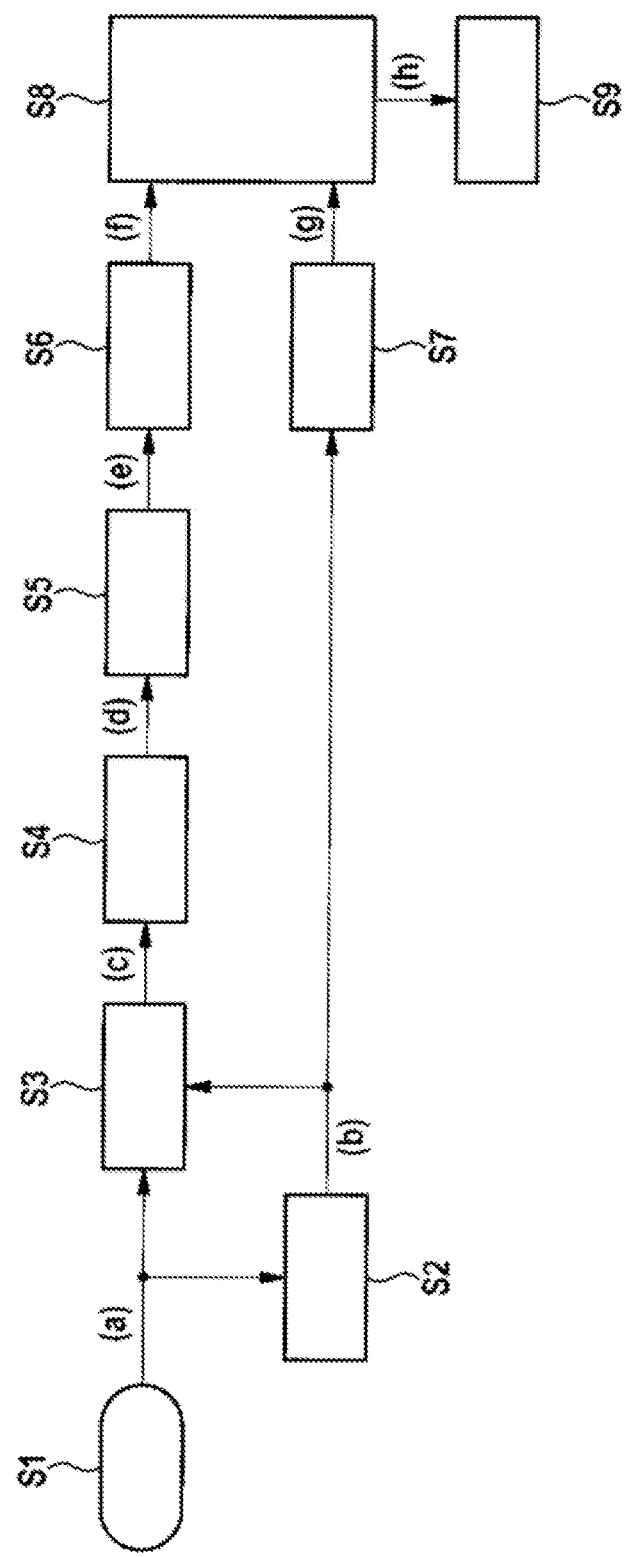
FIG. 2 shows a flow diagram for the explanation of an advantageous method for operating the sensor device.

FIG. 2 shows the advantageous method with reference to a flow diagram. In a first step S1, an output signal a, which depends on the instantaneous angle of rotation y, is provided by means of the sensor device 2. The sensor device 2 is here in particular designed as an inductive sensor device. The output signal a can in particular be derived from the amplitude or the frequency of the coil signals of the sensor device 2. In the case of a three-phase design of the sensor device 2, the signal consists of three partial signals, and of two partial signals in the case of a two-phase design.

The parameters of the partial signals are estimated from the output signal in a step S2, wherein the parameters are in particular respectively the signal amplitude (which corresponds to half of the signal excursion), the signal phase relative to the instantaneous angle of rotation φ and the signal offset (displacement from the zero position). These parameters represent the output signal B. For the estimation of the parameters it is necessary that the output signal a is processed at different angles of rotation φ.

In an optional step S3, the partial signals of the output signal a are normalized with the aid of the previously determined parameter b, so that, for example, they have a low offset, have a predetermined amplitude and each have defined phases with respect to the instantaneous angle of rotation φ. A normalized output signal c results from this.

In the case of a three-phase design of the sensor device 2, the three-phase signal is subsequently converted in a step S4 into a two-phase signal d. The Clarke transformation is used for this purpose. This step is omitted in the case of two-phase sensors.

In a following step S5, a single intermediate variable e, which can be referred to as a vector length, is calculated from the two-phase output signal d. The following formula can be used as a basis for this:

$$r(k) = \sqrt{c_1(k)^2 + c_2(k)^2}$$

Here r(k) is the output signal e, while $c_1(k)$ and $c_2(k)$ are the two components (sine/cosine) of the input signal d. The variable k refers to the index of the sampling time-point.

The determination of the amplitude of the harmonics to be examined, in particular of the third harmonics in the angle domain corresponds to the second harmonics in the signal domain cas is shown in the table for the case of n=2), takes place in processing step S6 using a plurality of values e. The following formula can be used for the third harmonic in the angle domain:

$$a = \frac{1}{6}\sum_{k=1}^{6}(-1)^k r(k)$$

Here, a is the amplitude of the harmonics corresponding to the output signal f, k is the sampling time-point, and r(k) is the input signal e. It is also possible to take into account more than six sampling time-points in each rotation, wherein six sampling time-points at the respective minima and maxima are particularly expedient. These six sampling time-points are distributed evenly over a rotation, with a spacing of 60°, wherein the absolute position of the first sampling time-point $r_1$ does not have to be at 0, but depends on the phase position of the harmonics of the error.

Figure 3:
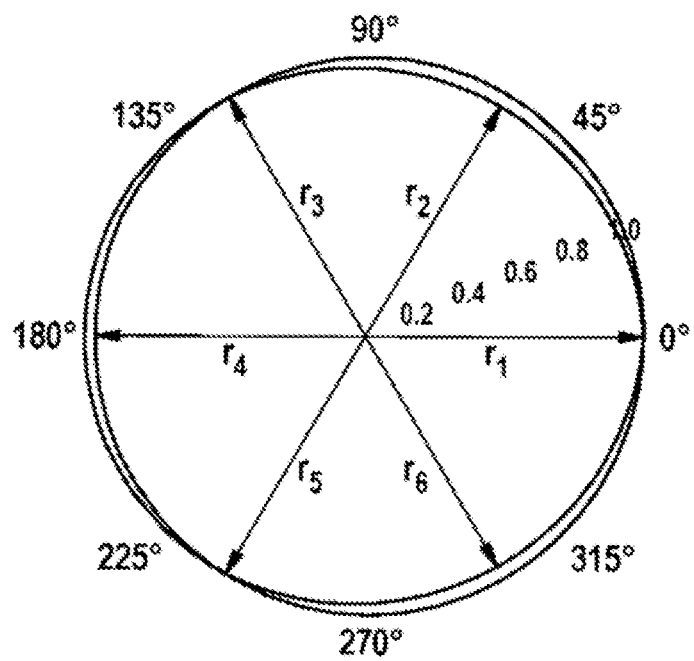
FIG. 3 shows a simplified illustration of sampling locations for carrying out the method.

FIG. 3 shows in this connection a simplified illustration of the sampling locations or sampling time-points for the determinations of the amplitude of the third harmonics of the angle error.

Figure 4:
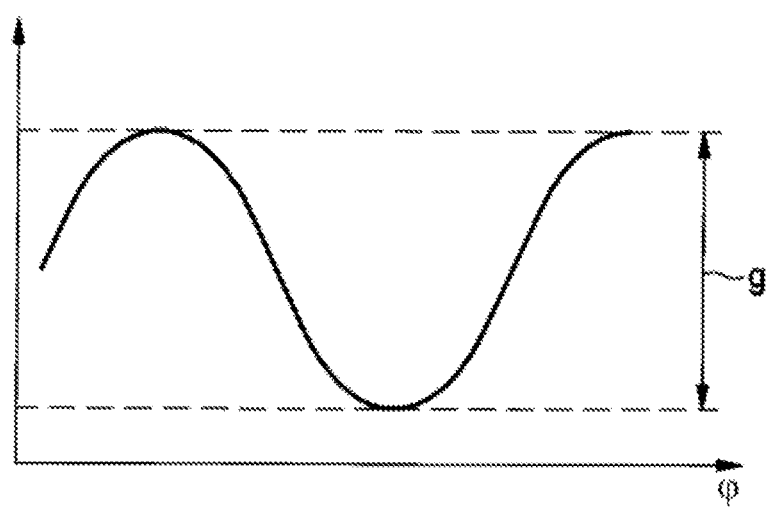
FIG. 4 shows a signal excursion of sensor signals.

The amplitudes of the sensor signals, which can thus be extracted from the signal parameters b, are determined in step S7. These amplitudes represent the output signal g. FIG. 4 shows in this connection in a diagram of a demodulated output signal over the angle of rotation φ with a signal excursion g.

In processing step S8, relationships known from reference measurements between the signal excursion g and the distance Δx between the amplitudes of harmonics in the angle error, in particular of the third harmonics in the angle domain, are used to deduce the distance Δx from the known amplitudes of the harmonics of the error f and the signal excursion g. This distance represents the output signal h. The relationship between the signal excursion g and the axial distance Δx can be given, within a defined range of, for example, 0.2 mm to 4 mm, in the form of a monotonic function that results from the weaker electromagnetic field at greater distances, as is shown by way of example in FIG. 5.

Figure 5:
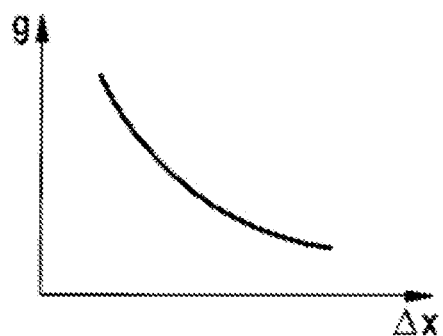
FIG. 5 shows a relationship between the signal excursion and an axial distance between a signal generator and a signal sensor of the sensor device.

In this connection, FIG. 5 shows in a diagram for example the signal excursion g against the distance Δx.

Figure 6:
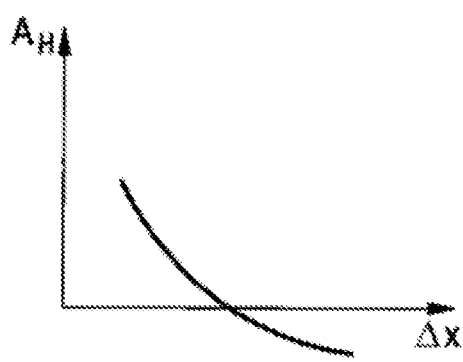
FIG. 6 shows a relationship between an amplitude of a specified harmonic in the sensor signal and the distance between signal generator and signal sensor.

FIG. 6 shows in a simplified form the relationship of the amplitude of the harmonics $A_H$ to the axial distance Δx. If this amplitude is understood to be related to a fixed phase position, it can also be negative in certain distance ranges. Typical values for this amplitude lie in the range between 0% up to 20% in relation to the mean value of the vector length e.

In step S9 the torque is estimated from the previously estimated distance Δx with the aid of the relationship, determined previously in reference measurements, between the distance Δx and the torque of the electric machine. This relationship between the distance Δx and the torque $M_d$ can typically be represented as a function with three distances, as shown in FIG. 7.

Figure 7:
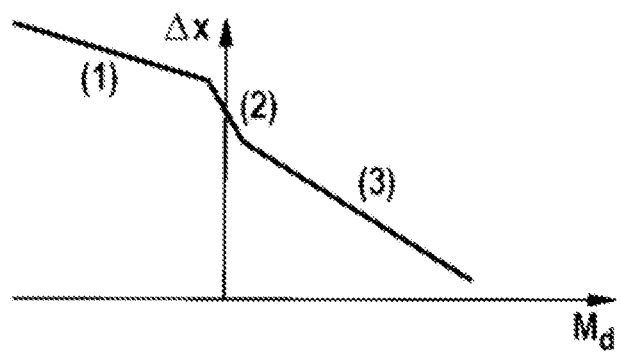
FIG. 7 shows a relationship between the axial distance and a torque of the electric machine.

FIG. 7 shows the distance Δx between the signal generator 8 and the signal sensor 7 plotted against the torque $M_d$. The relationship is divided into three sections (1), (2) and (3). Section (1) results with a torque MD in the one direction, and section (3) with a torque in the other direction, wherein these two sections can typically be described as linear functions that depend on the mechanical construction in the electric machine 1 and the sensor device 2 in particular. Section (2) lies in the transition region between sections (1) and (2), and results from the bearing play of the mechanical construction which typically leads to a higher gradient (distance divided by torque) in this region.

Figure 8:
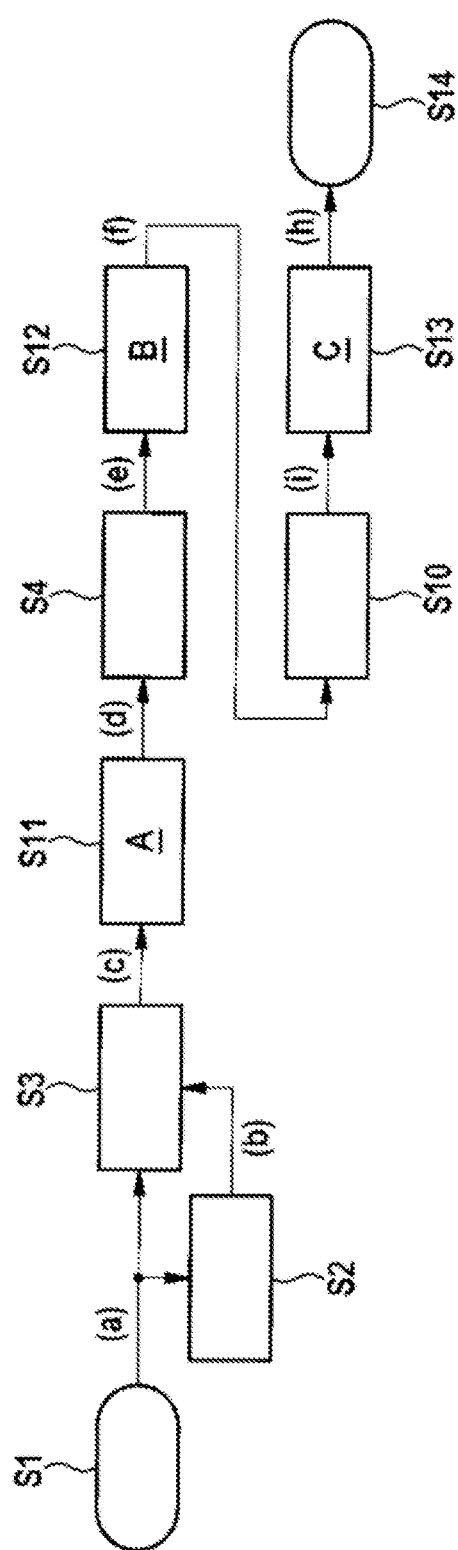
FIG. 8 shows a further flow diagram for explanation of an advantageous development of the method.

The process for an improved correction, which is carried out on the control device 12, is presented below with reference to FIG. 8. The steps S1, S2, S3 and S4 are already known from the exemplary embodiment of FIG. 2. In a step S10 an angle is calculated as the output signal (i) from the input signals (f), which represent sine/cosine signals over one rotation of the signal generator 8 with respect to the signal sensor 7, making use of the arctangent function. A correction of the angle error that arises a result of harmonics in the signal domain, in particular as a result of the second harmonics in the signal domain, is advantageously integrated into the method on at least one of three points A, B and C as a method step. Point A occurs here as step S11, which follows step S3 and thus takes place before the Clarke transformation in step S4, point B occurs as step S12 following the Clarke transformation in step S4, and point C occurs as step S13 after the arctangent function. Any desired combinations of multiple correction blocks A, B, C are possible here in order to obtain a corrected angle $φ_{korr}$ in step S14.

In the case of the correction A, the output signal d is calculated for the three-phase signal (C) with the help of a previously determined, uncorrected angle $φ_{unkorrigient}$ and the previous determined amplitude a and phase Δ of the harmonics n that is to be corrected, in that for each signal phase, and for every harmonic to be corrected, the value of the respective cosine function is determined and subtracted from the signal (c):

$$a \cdot \cos(n \cdot φ_{unkorr} + θ)$$

In the case of correction B, the same procedure is applied to the two-phase signal (e) in order to generate the output signal (f).

In the case of correction C, the correction is applied in the angle domain to the previously determined angle (g), whereby the conversion of the amplitude and the harmonic number n in the signal domain into the error amplitude and the harmonic number in the angle domain takes place in accordance with the table discussed previously.

It is particularly advantageous with correction C that it is only to be applied to a single signal, and therefore requires the least computing effort. It is advantageous for correction A that the achievable correction precision is particularly high, since the correction can be applied to all three sensor signals $s_1$, $s_2$, $s_3$ separately.

The invention claimed is:

1. A method of operating a sensor device of an electric machine having a rotor shaft mounted rotatably in a housing, the sensor device comprising a signal generator joined non-rotatably to the rotor shaft and arranged axially on an end face of the rotor shaft, and a signal sensor fixed to the housing and arranged opposite to the end face of the signal generator at a distance from the signal generator, the method comprising:
- capturing a multi-part output signal of the signal sensor that depends on an angle of rotation;
- determining at least signal parameters, signal amplitude, signal phase and signal offset of a respective partial signal;
- calculating an intermediate variable;
- determining the amplitude of a specified harmonic;
- determining a current axial distance Ax between the signal generator and the signal sensor depending on the determined amplitude; and
- determining a current torque of the electric machine depending on the determined distance Δx.

2. The method according to claim 1, further comprising, if more than two partial signals are present, carrying out a Clarke transformation before calculating the intermediate variable.

3. The method according to claim 1, wherein the intermediate variable is determined in accordance with the following formula:

$$r(k) = \sqrt{c_1(k)^2 + c_2(k)^2},$$

where r(k) represents the multi-part output signal, $c_1(k)$ and $c_2(k)$ represent sine and cosine components of the input signal (d), and k represents the sampling time-point.

4. The method according to claim 1, wherein the amplitude of the specified harmonic is determined with the aid of the following formula:

$$a = \frac{1}{2n} \sum_{k=1}^{2n} (-1)^k r(k),$$

where a is the amplitude of the harmonic, n is the harmonic to be considered, k is the sampling time-point and r(k) is the input signal (e) at the sampling time-point k.

5. The method according to claim 1, further comprising: comparing the amplitude of the sensor signals determined from the signal parameters with the amplitude of the specified harmonic to verify the distance Δx.

6. The method according to claim 2, wherein an angle is determined as an output signal of the Clarke transformation, and the angle is corrected with an arctangent function.

7. The method according to claim 1, wherein the calculating of the intermediate variable includes calculating the intermediate variable from partial signals of the output signal.

8. The method according to claim 1, wherein the specified harmonic is the third harmonic.

* * * * *